US012631226B2

(12) United States Patent
Yoon

(10) Patent No.: US 12,631,226 B2
(45) Date of Patent: May 19, 2026

(54) BRAKE DEVICE

(71) Applicant: HYUNDAI MOBIS CO., LTD., Seoul (KR)

(72) Inventor: Bo Ram Yoon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 326 days.

(21) Appl. No.: 18/199,470

(22) Filed: May 19, 2023

(65) Prior Publication Data

US 2024/0328468 A1     Oct. 3, 2024

(30) Foreign Application Priority Data

Dec. 12, 2022    (KR) ........................ 10-2022-0172403

(51) Int. Cl.
| | |
|---|---|
| *F16D 55/226* | (2006.01) |
| *F16D 55/00* | (2006.01) |
| *F16D 65/00* | (2006.01) |
| *F16D 65/18* | (2006.01) |
| *F16D 125/40* | (2012.01) |

(52) U.S. Cl.
CPC ....... *F16D 55/226* (2013.01); *F16D 65/0068* (2013.01); *F16D 65/18* (2013.01); *F16D 2055/0016* (2013.01); *F16D 2125/40* (2013.01)

(58) Field of Classification Search
CPC .. F16D 2121/24; F16D 65/18; F16D 2125/48; F16D 2125/40; F16D 55/22; F16D 55/227; F16D 55/226; F16D 65/0068; F16D 65/0018; F16D 2055/0016; F16D 2125/14; F16D 2125/24; F16D 65/092; F16D 65/14; F16D 2125/10

USPC .......................................................... 188/72.8
See application file for complete search history.

(56) References Cited

U.S. PATENT DOCUMENTS

| | | | | | |
|---|---|---|---|---|---|
| 4,819,768 | A | * | 4/1989 | Czich | F16D 65/567 |
| | | | | | 188/196 D |
| 5,123,505 | A | * | 6/1992 | Antony | F16D 65/567 |
| | | | | | 188/71.9 |
| 5,449,052 | A | * | 9/1995 | Macke | F16D 65/567 |
| | | | | | 188/71.9 |
| 5,582,273 | A | * | 12/1996 | Baumgartner | F16D 65/568 |
| | | | | | 188/71.8 |

(Continued)

FOREIGN PATENT DOCUMENTS

| | | |
|---|---|---|
| DE | 19913939 A1 | 9/1999 |
| DE | 10137880 A1 | 5/2002 |

(Continued)

OTHER PUBLICATIONS

German Office Action dated Feb. 13, 2026 issued in German Patent Application No. 102023113603.8 (with English translation).

*Primary Examiner* — Henry Y Liu
(74) *Attorney, Agent, or Firm* — Morgan Lewis & Bockius LLP

(57) ABSTRACT

A brake device includes a brake pad, a pad propulsion part connected to the brake pad and configured to move the brake pad linearly, and a caliper body including a cylinder part on which the pad propulsion parti is accommodated. The pad propulsion part includes a conversion assembly converting rotation motion into linear motion, and a piston connected to one end of the conversion assembly, the conversion assembly is accommodated inside the cylinder part, and the piston is located outside the cylinder part.

12 Claims, 10 Drawing Sheets

(56) References Cited

U.S. PATENT DOCUMENTS

| | | | | |
|---|---|---|---|---|
| 5,664,646 | A * | 9/1997 | Bejot | F16D 65/18 |
| | | | | 188/71.9 |
| 5,769,189 | A * | 6/1998 | Heibel | B60T 11/046 |
| | | | | 188/106 P |
| 5,833,035 | A * | 11/1998 | Severinsson | F16D 65/183 |
| | | | | 188/71.9 |
| RE37,231 | E * | 6/2001 | Severinsson | F16D 65/18 |
| | | | | 188/71.9 |
| 6,435,319 | B1 * | 8/2002 | Thomas | F16D 65/183 |
| | | | | 188/71.9 |
| 6,907,967 | B1 * | 6/2005 | Kapaan | H02K 7/06 |
| | | | | 188/162 |
| 7,219,772 | B2 * | 5/2007 | Bieker | F16D 65/0037 |
| | | | | 188/71.8 |
| 7,635,050 | B2 * | 12/2009 | Yamamoto | F16D 65/54 |
| | | | | 188/73.1 |
| 8,286,759 | B2 * | 10/2012 | Baumgartner | B60T 17/088 |
| | | | | 188/71.9 |
| 9,180,844 | B2 * | 11/2015 | Murata | B60T 13/741 |
| 9,188,182 | B2 * | 11/2015 | Park | F16H 48/08 |
| 9,297,433 | B2 * | 3/2016 | Takewaki | F16D 65/18 |
| 9,316,277 | B2 * | 4/2016 | Winkler | F16D 65/18 |
| 9,441,690 | B2 * | 9/2016 | Burgoon | F16D 65/18 |
| 9,587,692 | B2 * | 3/2017 | Gutelius | F16D 65/18 |
| 9,638,300 | B2 * | 5/2017 | Drennen | H02K 7/06 |
| 9,989,114 | B2 * | 6/2018 | Chelaidite | F16D 55/22 |
| 10,030,728 | B2 * | 7/2018 | Chelaidite | F16D 55/226 |
| 10,267,369 | B2 * | 4/2019 | Lethorn | F16D 55/22 |
| 10,851,858 | B2 * | 12/2020 | Satoh | F16D 65/0971 |
| 10,914,350 | B2 * | 2/2021 | Noguchi | F16D 55/228 |
| 11,085,500 | B2 * | 8/2021 | Jubik | F16D 55/226 |
| 11,098,779 | B2 * | 8/2021 | Hur | F16D 13/10 |
| 11,193,547 | B2 * | 12/2021 | Gerber | B60T 1/065 |
| 11,209,061 | B2 * | 12/2021 | Jenkins | F16D 55/226 |
| 11,230,275 | B2 * | 1/2022 | Smith | B62D 5/046 |
| 11,313,422 | B2 * | 4/2022 | Hagiwara | F16D 65/183 |
| 11,332,113 | B2 * | 5/2022 | Ikuma | B60T 13/741 |
| 11,339,842 | B2 * | 5/2022 | Al-Mahshi | F16D 55/22 |
| 11,428,284 | B2 * | 8/2022 | Odaira | F16D 55/226 |
| 11,433,865 | B2 * | 9/2022 | Gerber | B60T 13/588 |
| 11,453,374 | B2 * | 9/2022 | Mitsugi | F16D 55/224 |
| 11,460,082 | B2 * | 10/2022 | Al-Mahshi | F16D 65/183 |
| 11,493,103 | B2 * | 11/2022 | Jung | F16D 55/2262 |
| 11,554,766 | B2 * | 1/2023 | Chelaidite | F16D 65/183 |
| 11,577,711 | B2 * | 2/2023 | Ritter | F16D 65/0043 |
| 11,655,867 | B2 * | 5/2023 | Lou | F16D 65/183 |
| | | | | 188/72.4 |
| 11,698,116 | B2 * | 7/2023 | Kim | F16D 55/226 |
| | | | | 188/71.9 |
| 11,719,296 | B2 * | 8/2023 | Al-Mahshi | B60T 13/746 |
| | | | | 188/72.1 |
| 11,746,839 | B2 * | 9/2023 | Al-Mahshi | F16D 65/18 |
| | | | | 188/71.9 |
| 11,773,936 | B2 * | 10/2023 | Al-Mahshi | F16D 55/228 |
| | | | | 188/72.3 |
| 11,815,143 | B2 * | 11/2023 | Baek | F16D 65/183 |
| 11,846,335 | B2 * | 12/2023 | Kim | F16D 65/18 |
| 11,892,044 | B2 * | 2/2024 | Kim | B60T 13/741 |
| 11,971,075 | B1 * | 4/2024 | Oberdorfer | F16D 65/183 |
| 11,993,239 | B2 * | 5/2024 | Goto | F16D 65/64 |
| 12,038,054 | B2 * | 7/2024 | Kang | F16D 65/183 |
| 12,084,016 | B2 * | 9/2024 | Baek | F16D 65/18 |
| 12,092,177 | B2 * | 9/2024 | Kim | F16D 65/0979 |
| 12,103,504 | B2 * | 10/2024 | Wang | F16D 65/0068 |
| 12,139,115 | B2 * | 11/2024 | Jang | B60T 13/746 |
| 12,168,428 | B2 * | 12/2024 | Lim | F16D 65/183 |
| 12,173,765 | B2 * | 12/2024 | Chung | F16D 65/183 |
| 12,194,971 | B2 * | 1/2025 | Hossfeld | H02K 11/21 |
| 12,209,627 | B2 * | 1/2025 | Kim | F16D 55/226 |
| 12,252,104 | B2 * | 3/2025 | Baek | F16D 65/18 |
| 12,276,313 | B2 * | 4/2025 | Kim | F16D 66/021 |
| 12,280,753 | B2 * | 4/2025 | Suzuki | F16D 55/226 |
| 12,326,176 | B2 * | 6/2025 | Brubaker | F16H 25/2204 |
| 12,372,131 | B2 * | 7/2025 | Sauerberg | F16D 65/183 |

| | | | | |
|---|---|---|---|---|
| 2004/0045776 | A1 * | 3/2004 | Baumgartner | F16D 65/0037 |
| | | | | 188/71.7 |
| 2006/0021831 | A1 * | 2/2006 | Yamamoto | F16D 65/18 |
| | | | | 188/159 |
| 2010/0122877 | A1 * | 5/2010 | Kim | F16D 65/18 |
| | | | | 188/72.8 |
| 2012/0103733 | A1 * | 5/2012 | Sekiguchi | F16D 65/18 |
| | | | | 188/72.1 |
| 2013/0240305 | A1 * | 9/2013 | Thomas | F16D 65/0075 |
| | | | | 188/72.4 |
| 2014/0041970 | A1 * | 2/2014 | Burgoon | F16D 65/18 |
| | | | | 188/72.4 |
| 2014/0290477 | A1 * | 10/2014 | Ruiz | F16J 1/008 |
| | | | | 188/72.4 |
| 2015/0167761 | A1 * | 6/2015 | Son | F16D 65/18 |
| | | | | 188/72.6 |
| 2015/0204402 | A1 * | 7/2015 | Gutelius | F16D 65/22 |
| | | | | 188/162 |
| 2015/0354650 | A1 * | 12/2015 | Bull | F16D 65/18 |
| | | | | 188/162 |
| 2015/0354651 | A1 * | 12/2015 | Park | F16D 55/228 |
| | | | | 188/72.1 |
| 2015/0362031 | A1 * | 12/2015 | Kong | F16D 55/225 |
| | | | | 188/72.7 |
| 2016/0017942 | A1 * | 1/2016 | Kwon | F16D 65/18 |
| | | | | 188/162 |
| 2016/0076607 | A1 * | 3/2016 | Yasui | F16D 55/226 |
| | | | | 188/69 |
| 2016/0215840 | A1 * | 7/2016 | Chelaidite | F16D 55/226 |
| 2016/0290424 | A1 * | 10/2016 | Gutelius | F16D 65/183 |
| 2017/0058979 | A1 * | 3/2017 | Bahmata | F16D 55/226 |
| 2018/0135711 | A1 * | 5/2018 | Chelaidite | F16D 65/18 |
| 2019/0032735 | A1 * | 1/2019 | Lethorn | F16D 55/22 |
| 2019/0063527 | A1 * | 2/2019 | Thomas | F16D 65/18 |
| 2019/0120306 | A1 * | 4/2019 | Satoh | F16D 65/0068 |
| 2019/0383336 | A1 * | 12/2019 | Noguchi | F16D 55/226 |
| 2020/0158198 | A1 * | 5/2020 | Smith | B60T 1/065 |
| 2020/0191211 | A1 * | 6/2020 | Suzuki | F16D 65/0087 |
| 2020/0217379 | A1 * | 7/2020 | Odaira | F16D 65/183 |
| 2020/0240484 | A1 * | 7/2020 | Hur | F16D 13/10 |
| 2020/0278000 | A1 * | 9/2020 | Hagiwara | B60T 13/74 |
| 2020/0309213 | A1 * | 10/2020 | Al-Mahshi | F16D 65/183 |
| 2020/0309214 | A1 * | 10/2020 | Al-Mahshi | F16D 65/183 |
| 2020/0377070 | A1 * | 12/2020 | Yokoyama | B60T 13/741 |
| 2020/0408265 | A1 * | 12/2020 | Al-Mahshi | F16D 65/183 |
| 2021/0001826 | A1 * | 1/2021 | Gerber | B60T 13/741 |
| 2021/0039620 | A1 * | 2/2021 | Mitsugi | F16D 65/183 |
| 2021/0095731 | A1 * | 4/2021 | Jubik | F16D 65/46 |
| 2021/0102588 | A1 * | 4/2021 | Jung | F16D 65/0068 |
| 2021/0140501 | A1 * | 5/2021 | Kim | F16D 65/183 |
| 2021/0172489 | A1 * | 6/2021 | Jenkins | F16D 65/18 |
| 2021/0215215 | A1 * | 7/2021 | Kim | F16D 55/226 |
| 2021/0231183 | A1 * | 7/2021 | Shin | F16D 55/226 |
| 2021/0254679 | A1 * | 8/2021 | Kim | B60T 13/741 |
| 2021/0301889 | A1 * | 9/2021 | Gerber | B60T 13/746 |
| 2021/0348663 | A1 * | 11/2021 | Lou | F16D 65/183 |
| 2021/0364055 | A1 * | 11/2021 | Lou | F16D 55/2265 |
| 2021/0387603 | A1 * | 12/2021 | Hur | F16D 65/183 |
| 2021/0394735 | A1 * | 12/2021 | Jang | B60T 13/746 |
| 2021/0404524 | A1 * | 12/2021 | Al-Mahshi | F16D 65/183 |
| 2022/0024434 | A1 * | 1/2022 | Baek | F16D 65/183 |
| 2022/0025946 | A1 * | 1/2022 | Kim | F16J 15/18 |
| 2022/0025947 | A1 * | 1/2022 | Baek | F16D 65/18 |
| 2022/0032886 | A1 * | 2/2022 | Goto | F16D 65/183 |
| 2022/0065314 | A1 * | 3/2022 | Kim | B60T 13/741 |
| 2022/0212644 | A1 * | 7/2022 | Wang | F16D 55/2265 |
| 2022/0242384 | A1 * | 8/2022 | Baek | B60T 17/221 |
| 2022/0281431 | A1 * | 9/2022 | Ritter | F16D 65/14 |
| 2022/0297654 | A1 * | 9/2022 | Chelaidite | F16D 55/226 |
| 2022/0297657 | A1 * | 9/2022 | Kim | B60T 13/741 |
| 2022/0297660 | A1 * | 9/2022 | Lim | F16D 65/183 |
| 2022/0325765 | A1 * | 10/2022 | Chung | F16D 65/66 |
| 2022/0356917 | A1 * | 11/2022 | Kang | F16D 65/183 |
| 2022/0364618 | A1 * | 11/2022 | Brubaker | F16D 66/00 |
| 2022/0373047 | A1 * | 11/2022 | Kim | F16D 65/183 |
| 2022/0388490 | A1 * | 12/2022 | Suzuki | B60T 13/746 |

(56) References Cited

U.S. PATENT DOCUMENTS

| | | | | |
|---|---|---|---|---|
| 2022/0389981 | A1* | 12/2022 | Leiter ................... | F16D 65/183 |
| 2022/0403902 | A1* | 12/2022 | Kim ..................... | F16D 66/021 |
| 2022/0410862 | A1* | 12/2022 | Hossfeld .............. | F16D 55/226 |

FOREIGN PATENT DOCUMENTS

| | | | |
|---|---|---|---|
| DE | 69621032 | T2 | 4/2003 |
| DE | 69907503 | T2 | 3/2004 |

* cited by examiner

<IDLE states>

<Moving nut moves forward, contact with a piston>

<Moving nut moves backward(returns)>

240

246

241 241 241

BRAKE DEVICE

Pursuant to 35 U.S.C. § 119(a), this application claims the benefit of earlier filing dates and right of priority to Korean Application No. 10-2022-0172403, filed on Dec. 12, 2022, the contents of which are hereby incorporated by reference herein in their entirety.

BACKGROUND OF THE DISCLOSURE

Field of the Disclosure

Embodiments relates to a brake device applicable to a vehicle in all fields, and more particularly to a brake device connected to a brake disc of a vehicle.

Discussion of the Related Art

A brake device mounted on a vehicle is a device for decelerating or stopping the vehicle while driving, or maintaining a stopped state of the vehicle, and brakes the vehicle by strongly pressing a disc-shaped brake disc that rotates along with a wheel of the vehicle with brake pads from both sides.

FIG. 1 shows a conventional brake device. Referring to FIG. 1, a piston connected to the brake pad 20 is inserted into a space formed in a caliper body 10. Therefore, the piston is moved by propellants 100 and 30 in the corresponding space, and a moving direction thereof is guided along a direction of the space. However, in this structure, since the caliper body 10 needs to include a space for accommodating the entire piston, the volume and weight of the device increase, and the manufacturing cost is disadvantageous.

In addition, when the shape of the caliper body 10 is deformed due to long-term use of the brake device, the piston may be damaged by receiving an external force. For example, when a surface of the brake pad is worn out, a direction in which the piston presses the brake disc and a direction in which the piston is accommodated in the caliper body 10 may be mismatched. Accordingly, the piston may receive an external force having a direction different from that of the moving direction, and may be damaged by the external force.

Since the above problems affect the performance of the brake device, there is a need for improved technology.

SUMMARY OF THE DISCLOSURE

An object of embodiments of the present disclosure is to provide a brake device that resolves the above problems.

In detail, an object of embodiments of the present disclosure is to provide a brake device that reduces a possibility of damage to a piston.

An object of embodiments of the present disclosure is to provide a brake device with improved return characteristics of a piston.

An object of embodiments of the present disclosure is to provide a brake device with reduced weight and cost.

An object of embodiments of the present disclosure is to provide a brake device with improved surface pressure of a brake pad.

It will be appreciated by persons skilled in the art that the objects that could be achieved with the present disclosure are not limited to what has been particularly described hereinabove and the above and other objects that the present disclosure could achieve will be more clearly understood from the following detailed description.

To accomplish the aforementioned objects, a brake device includes a brake pad, a pad propulsion part connected to the brake pad and moving the brake pad linearly, and a caliper body including a cylinder part on which the pad propulsion parti is accommodated, wherein the pad propulsion part includes a conversion assembly converting rotation motion into linear motion, and a piston connected to one end of the conversion assembly, the conversion assembly is accommodated inside the cylinder part, and the piston is located outside the cylinder part.

The conversion assembly may include a bolt screw rotating around an axis, a moving nut coupled to a helix of the bolt screw, wherein the moving nut moves in a direction of the cylinder part by rotation of the bolt screw.

A diameter of a cross section of the piston may be greater than a diameter of a cross section of the cylinder part.

One end of the moving nut may be inserted into an inside of the piston and includes a first groove formed along a circumference, the piston may include a second groove at a position corresponding to the first groove on an inner surface, and the brake device may further include a seal part having a ring shape located in a space formed by the first groove and the second groove.

A surface of the one end of the moving nut and an inner surface of the piston may be spaced apart from each other by a predetermine distance. In this case, the predetermined distance may be equal to or less than 2 mm.

The cylinder part may include a third groove formed along an edge of a space, the moving nut may include a fourth groove formed along a circumference of an outer circumferential surface.

The brake device may further include a boot sealing a space between an outer surface of the moving nut and an edge of the cylinder part from an outside. The boot may be fixed by the third groove and the fourth groove.

A cross section of the seal part may be a rectangle, and the first groove and the second groove may be formed with a shape corresponding to the cross section of the seal part. Alternatively, a cross section of the seal part may be a circle, and the first groove and the second groove may be formed with a shape corresponding to the cross section of the seal part.

The piston may be provided in plurality, the moving unit may have a portion located inside the cylinder part and includes connection parts inserted into and connected to the pistons, and the connection parts may be located outside the cylinder part.

The connection parts may include first grooves formed along a circumference, the pistons may include second grooves at positions corresponding to the first grooves on respective inner surfaces, and the brake device may further include a plurality of seal parts located in a space formed by the first grooves and the second grooves. Surfaces of the connection parts and inner surfaces of the pistons may be spaced apart from each other by a predetermined distance, and the predetermined distance may be equal to or less than 2 mm.

In a brake device, a piston connected to a brake pad may not directly contact a shape of a caliper body.

A brake device includes a caliper body as a body of the brake device, an actuator propelling a brake pad and accommodated on the caliper body, and a piston connected between the actuator and the brake pad, wherein the caliper body includes a cylinder part as a space accommodating the actuator, and the piston is located outside the cylinder part.

According to an embodiment of the present disclosure, a possibility of damage to a piston of a brake device may be reduced.

According to an embodiment of the present disclosure, the return properties of the piston may be improved to resolve a drag phenomenon.

According to an embodiment of the present disclosure, surface pressure applied to a brake pad may be improved.

According to an embodiment of the present disclosure, the weight and cost of the brake device may be reduced.

The effects obtainable in the present disclosure are not limited to the effects mentioned above, and other effects not mentioned are clearly understood by those skilled in the art from the description below.

DETAILED DESCRIPTION OF THE DISCLOSURE

Figure 1:
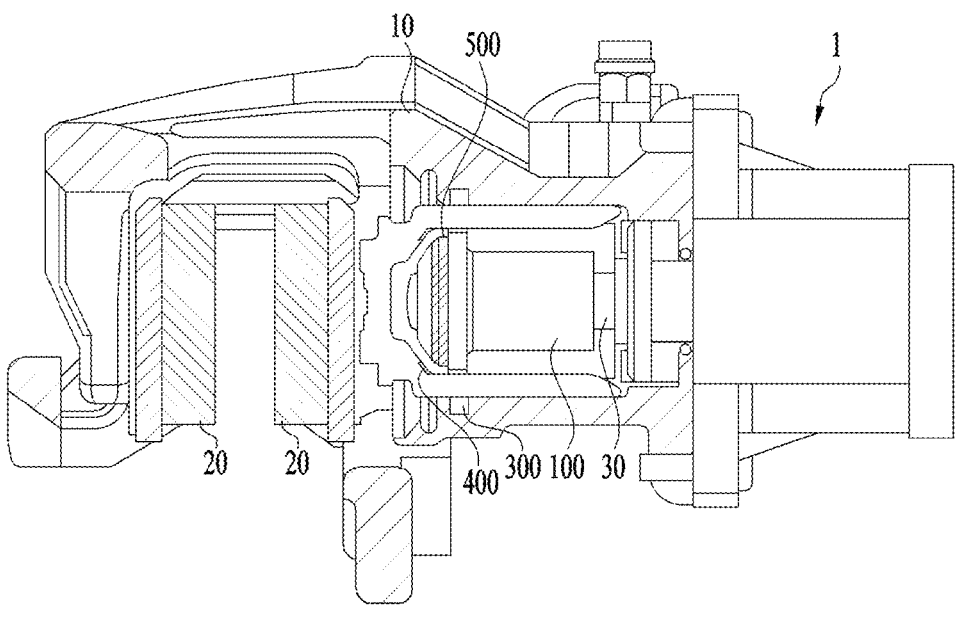
FIG. 1 shows a cross section of a conventional brake device.

Advantages and features of the present disclosure, and methods of achieving them may be clear with reference to the detailed description of the following embodiments taken in conjunction with the accompanying drawings. However, the present disclosure is not limited to the embodiments disclosed below, but may be implemented in various different forms, only these embodiments are intended to complete the disclosure of the present disclosure, and are common in the art to which the present disclosure belongs. It is provided to fully inform the person skilled in the art of the scope of the present disclosure, and the present disclosure is only defined by the scope of the claims.

Terminology used herein is for describing the embodiments and is not intended to limit the present disclosure. In this specification, singular forms also include plural forms unless specifically stated otherwise in a phrase. As used herein, "comprises" and/or "comprising" does not exclude the presence or addition of one or more other elements other than the recited elements. Like reference numerals throughout the specification refer to like elements, and "and/or" includes each and every combination of one or more of the recited elements. Although "first", "second", etc. are used to describe various components, these components are not limited by these terms, of course. These terms are only used to distinguish one component from another. Accordingly, it goes without saying that the first element mentioned below may also be the second element within the technical spirit of the present disclosure.

Unless otherwise defined, all terms (including technical and scientific terms) used in this specification may be used with meanings commonly understood by those skilled in the art to which the present disclosure belongs. In addition, terms defined in commonly used dictionaries are not interpreted ideally or excessively unless explicitly specifically defined.

The spatially relative terms "below", "beneath", "lower", "above", "upper", etc. may be used to easily describe a component's correlation with other components. Spatially relative terms should be understood as including different orientations of elements in use or operation in addition to the orientations shown in the drawings. For example, if a component that is shown in a drawing is inverted, a component described as "below" or "beneath" another component may be placed "above" the other component. Thus, the exemplary term "below" may include directions of both below and above. Components may also be oriented in other orientations, and thus spatially relative terms may be interpreted according to orientation.

Figure 2:
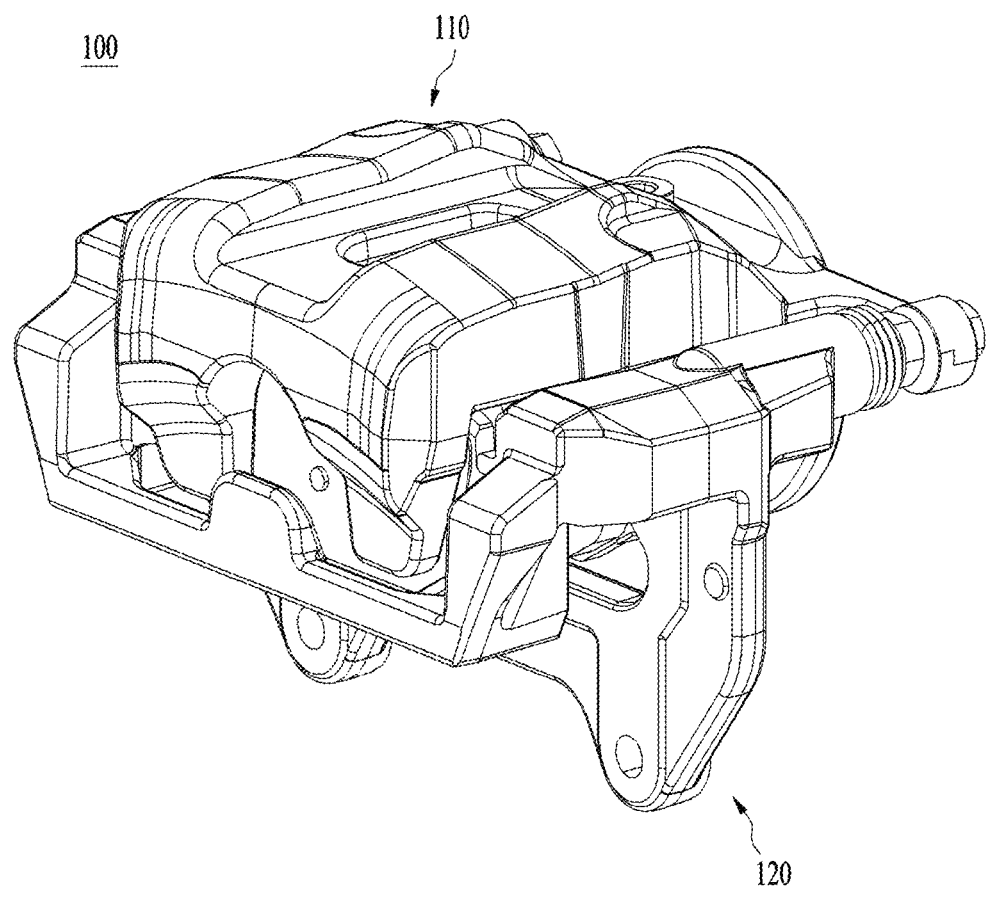
FIG. 2 is a perspective view of a brake device according to an embodiment of the present disclosure.

FIG. 2 shows a brake device 100 (hereinafter referred to as "brake device") according to an embodiment of the present disclosure. The brake device 100 may brake wheels by pressing a surface of a brake disc (not shown) of a vehicle with the brake pad 130. While the vehicle travels, the brake disc may rotate with the wheel, and when the brake device 100 applies pressure to the brake disc, rotation speed of the wheel may be reduced by providing resistance to rotation of the brake disc.

Figure 3:
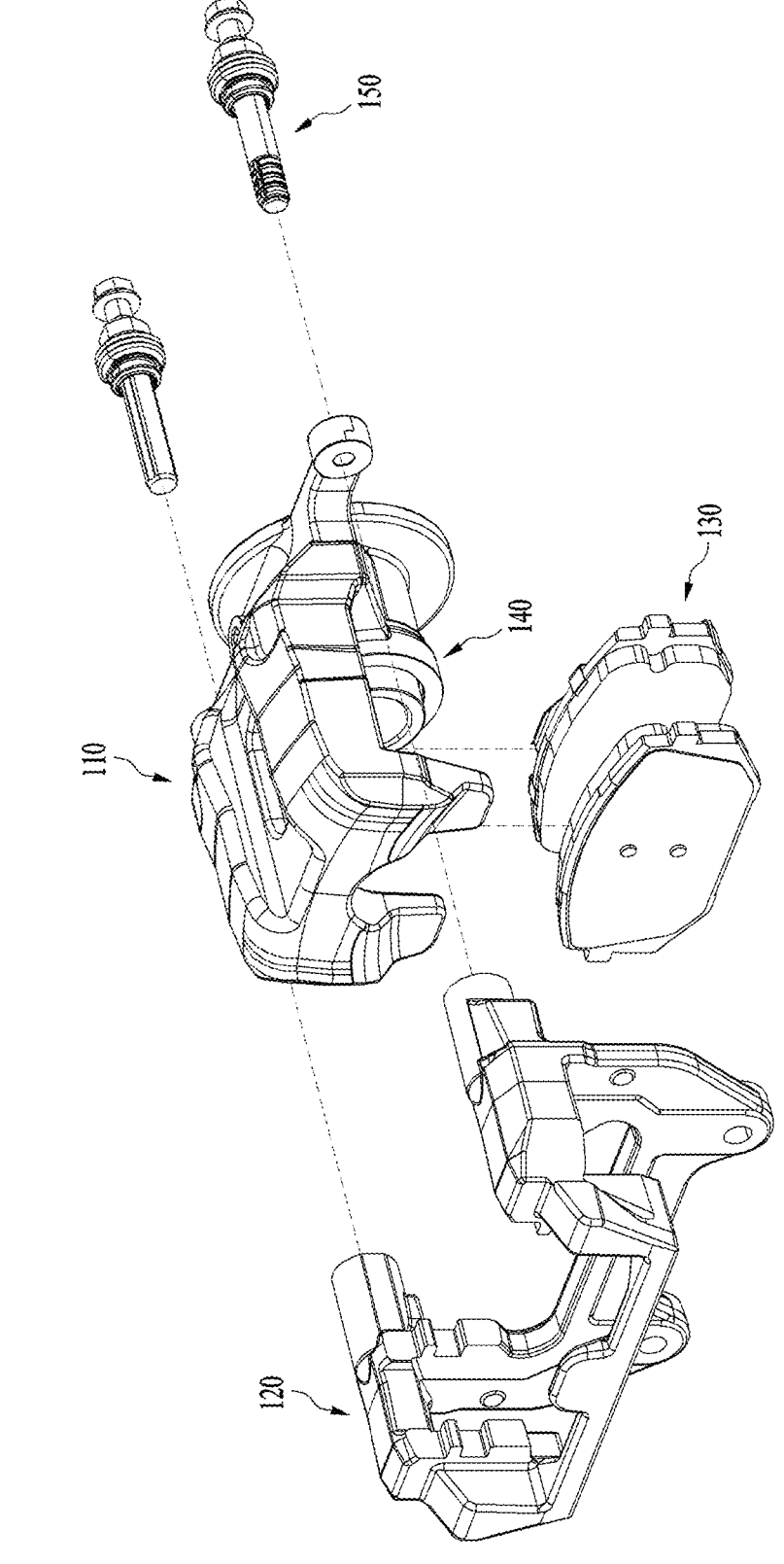
FIG. 3 is an exploded view of FIG. 2.

FIG. 3 is an exploded view of the brake device 100 shown in FIG. 2.

Referring to FIGS. 2 and 3, the brake device 100 may include a caliper body 110 and a pad carrier 120. The brake device 100 may include a brake pad 130, a pad propulsion part 140, and a connection pin 150.

The caliper body 110 is a body for connecting components of the brake device 100. The caliper body 110 is provided in a shape similar to a 'c' shape, and thus a portion of the brake disc may be located in a concave area. The brake pad 130 may be located inside the caliper body 110 to press both sides of the brake disc. Also, the caliper body 110 may include a cylinder part 112 on which the pad propulsion part 140 that propels the brake pad 130 is accommodated. The cylinder part 112 is formed as a space for accommodating the pad propulsion part 140.

The material and shape of the caliper body 110 may be variously determined in consideration of positions and loads of other components. In detail, the material of the caliper body 110 includes a metal-based material. The caliper body 110 may be made of a metal-based material having appropriate strength to support a reaction force against braking clamping force.

The pad carrier 120 is connected to the caliper body 110 by the connection pin 150, and is connected to both sides of the brake pad 130 to guide movement of the brake pad 130. The brake pad 130 may have protrusions on both side surfaces, and the pad carrier 120 may have grooves corresponding to the protrusions, and thus the protrusions of the brake pad 130 may be inserted into the grooves of the pad carrier 120.

The groove of the pad carrier 120 extends along a direction in which the brake pad 130 moves to press the brake disc. Therefore, the brake pad 130 may move while the protrusions on both sides are guided by the pad carrier 120.

The pad carrier 120 may be connected to a fixed component such as a knuckle (not shown) of a vehicle wheel, and the caliper body 110 connected to the pad carrier 120 may move while being guided in the direction of the connection pin 150. For example, during a braking operation, the caliper body 110 may move due to a reaction force applied by the brake pad 130 to the brake disc. The direction of the connection pin 150 is parallel to a direction in which the brake pad 130 propels.

The pad carrier 120 may be made of a metal-based material having appropriate strength to support braking torque applied to the brake pad 130.

The brake pad 130 may include a pad that rubs in direct contact the brake disc and a back plate connected to one surface of the pad. The brake pad 130 may be provided in plurality, and a first brake pad may press one side of the brake disc, and a second brake pad may press the other side of the brake disc. A pair of the brake pads 130 may be disposed in a state in which pad surfaces thereof face each other with the brake disc interposed therebetween.

Although not shown in the drawing, the brake device 100 may include a motor for driving the pad propulsion part 140 and a gear part including gears connected to the motor.

An operation of the motor may be controlled based on an electrical signal, and when the motor is operated, rotational motion of the motor may be transmitted to the pad propulsion part 140 through the gear part.

The gear part may include an assembly of a plurality of gears for transmitting rotational motion of the motor. The plurality of gears may be connected to the motor gear, and the type, number, position, and size of the plurality of gears may include various configurations devised by a person skilled in the art. The plurality of gears may be configured as a combination of various gear types such as a spur gear, a helical gear, and a worm gear.

Figure 4:
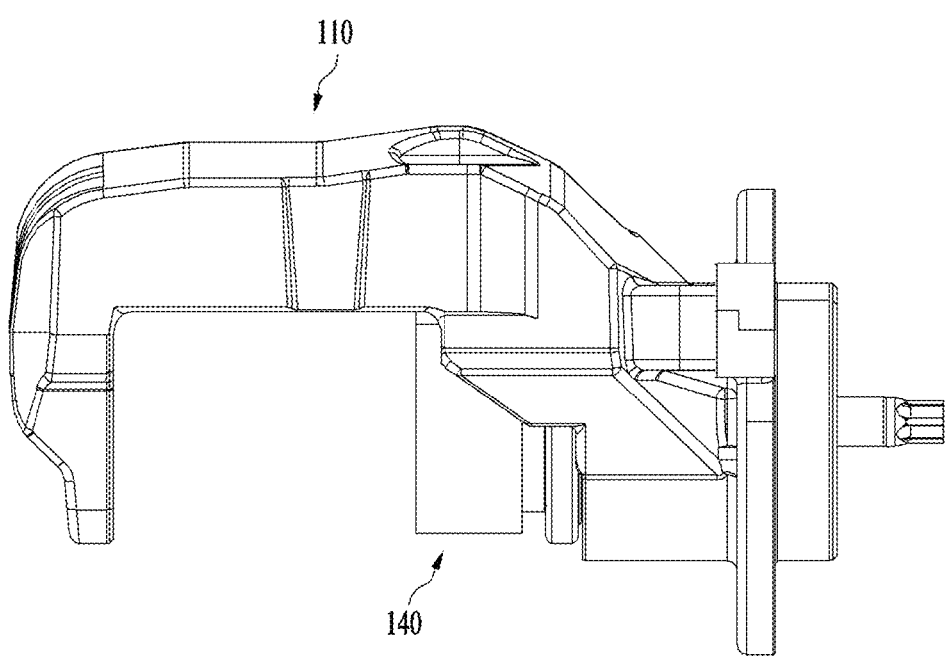
FIG. 4 shows a caliper body and a pad propulsion part according to an embodiment of the present disclosure.
Figure 5:
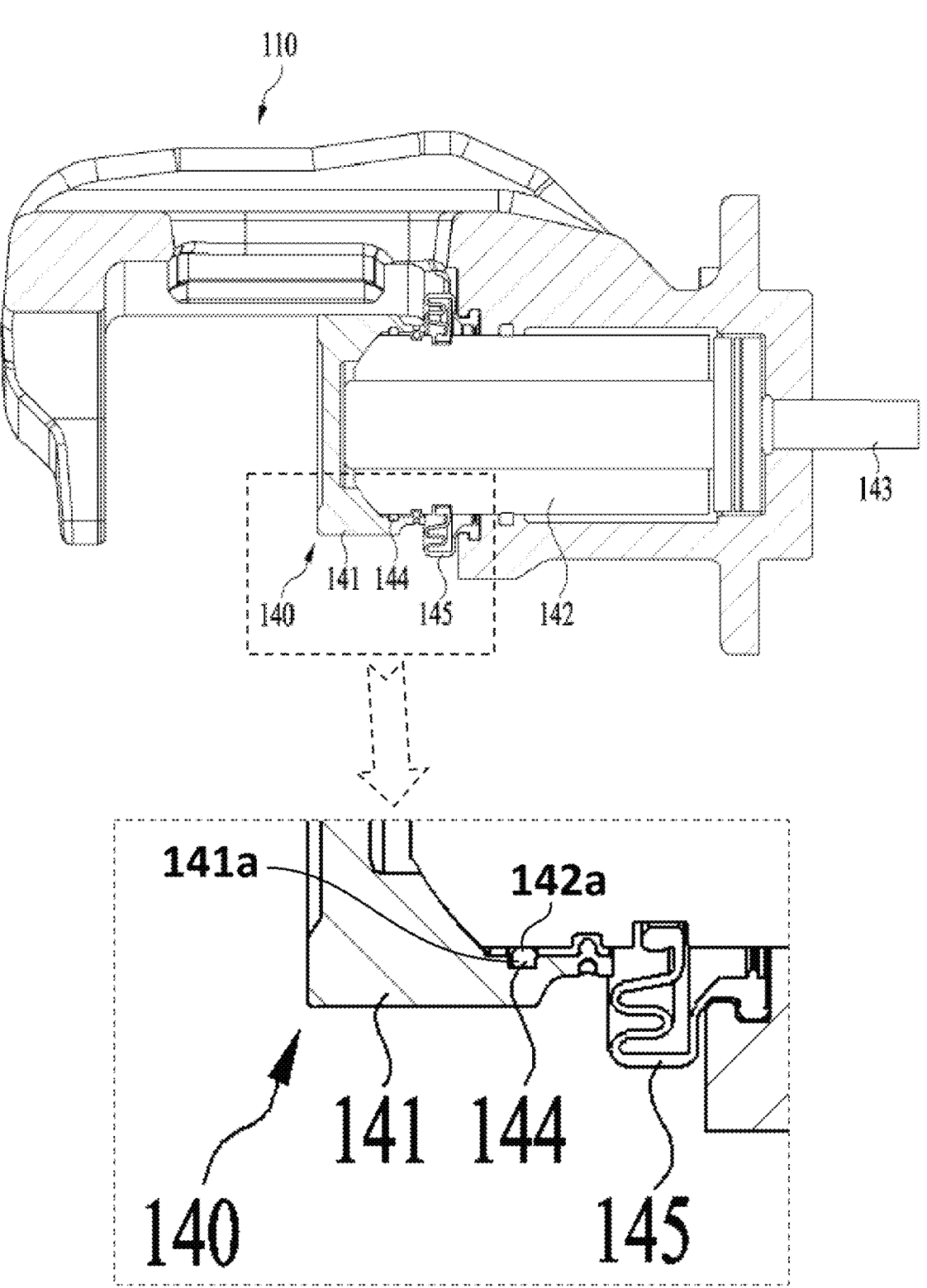
FIG. 5 shows a cross section of FIG. 4.
Figure 6:
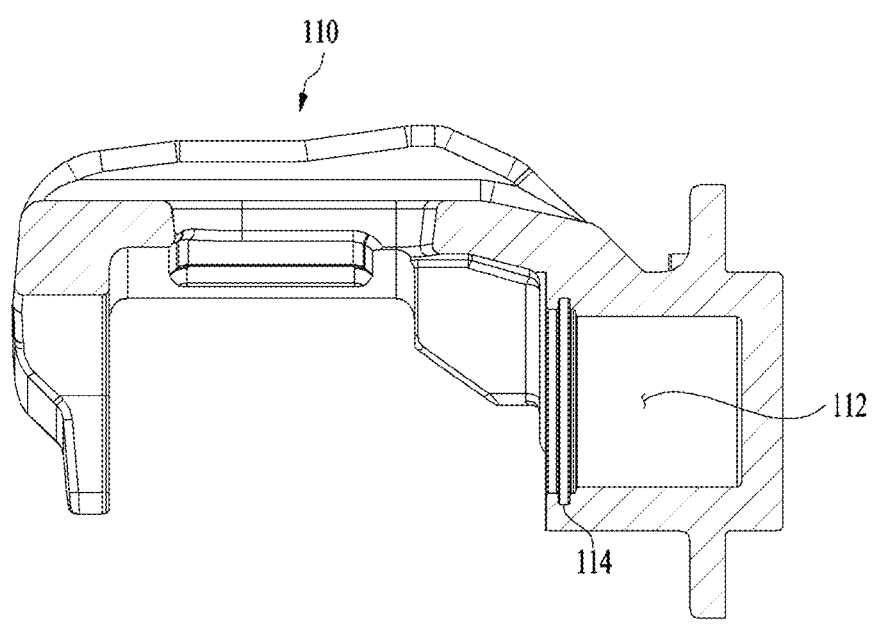
FIG. 6 shows a cross section of a caliper body according to an embodiment of the present disclosure.

FIG. 4 shows a state in which the caliper body 110 and the pad propulsion part 140 are connected from a side, and FIG. 5 is a cross sectional view of FIG. 4 taken vertically. FIG. 5 illustrates components of the pad propulsion part 140 that are not visible from the outside. FIG. 6 shows the caliper body 110 excluding the pad propulsion part 140 in FIG. 5. In FIGS. 4 to 6, unnecessary components other than the components to be described are omitted and illustrated.

The pad propulsion part 140 may receive power from the gear part to move the brake pad 130. Referring to FIGS. 4 to 6, the pad propulsion part 140 may include a piston 141, conversion assemblies 142 and 143, a seal part 144 and/or a boot 145. The pad propulsion part 140 may be referred to as an actuator.

The conversion assembly may represent various components and a connection method between components for converting rotational motion of a gear into linear motion. For example, in this embodiment, the conversion assembly includes a bolt screw 143 and a moving nut 142 corresponding thereto. The conversion assembly may be accommodated on the cylinder part 112. The cylinder part 112 may be a cylindrical space.

The bolt screw 143 may be engaged with a gear connected to the motor and rotates around an axis. The bolt screw 143 may be axially located at the center of the cylinder part 112. The axial direction of the bolt screw 143 is parallel to a direction in which the brake pad 130 moves (forward or backward). The bolt screw 143 is located in a space of the cylinder part 112 of the caliper body 110 and rotates in place.

Although not shown in the drawings, the bolt screw 143 includes a helical screw (screw) on an outer surface.

The moving nut 142 has a screw corresponding to the screw of the bolt screw 143, and is connected to the bolt screw 143 to move forward or backward according to the direction of rotation of the bolt screw 143. The moving nut 142 may protrude out of the cylinder part 112 or be drawn into the cylinder part 112 while being connected to the bolt screw 143 and moving. The moving nut 142 may move in a longitudinal direction of the cylinder part 112.

The length of the moving nut 142 may be formed long enough in such a way that a head thereof protrudes out of the cylinder part 112 even when the moving nut 142 is fully inserted into the cylinder part 112. That is, the length L1 of the moving nut may be greater than the length $D^1$ of the cylinder part 112. When a bearing is located inside the cylinder part 112, the length L1 of the moving nut is greater than a value obtained by subtracting the thickness W1 of the bearing from the length D1 of the cylinder part 112. That is, L1>(D1−W1).

The pad propulsion part 140 may further include a bearing connected to the bolt screw 143. One or more bearings are provided and may be located behind a tail of the moving nut 142. The bearing may include a screw bearing and maintain the position of the bolt screw 143 constant.

A portion of the moving nut 142 is located inside the cylinder part 112, and the movement of the moving nut 142 is guided by a direction of the cylinder part 112. The moving nut 142 may be referred to as a ball screw nut, and the structure of the bolt screw 143 and the moving nut 142 may be referred to as a ball screw structure.

According to another embodiment, the moving nut may include a protrusion or a groove on an outer circumferential surface thereof. The protrusion or the groove of the moving nut is formed parallel to a moving direction of the moving nut. In addition, an edge wall of the space of the cylinder part may include a groove or a protrusion corresponding to the protrusion or the groove of the moving nut. The groove or the protrusion formed in the space of the cylinder part is formed parallel to the moving direction of the moving nut. Therefore, the protrusion or the groove of the moving nut and the groove or the protrusion formed on the edge of the space of the cylinder part may be engaged with each other to prevent rotation of the moving nut. That is, it may be possible to improve the behavior performance of the brake pad to allow the brake pad to behave accurately by preventing the moving nut from rotating together with the bolt screw.

One end of the piston 141 is connected to the brake pad 130 and the other end is connected to the head of the moving nut 142 to transfer the motion of the moving nut 142 to the brake pad 130. The shape of the piston 141 may have a cylindrical shape with one surface open, and the head of the moving nut 142 may be inserted through the open surface to be connected to the piston 141. That is, the head of the moving nut 142 (the portion protruding out of the cylinder part) is connected to the piston 141. Therefore, when the moving nut 142 moves forward or backward, the piston 141 and the brake pad 130 connected to the moving nut 142 may move forward or backward together.

The piston 141 may not be inserted into the space of the cylinder part 112, and a diameter of a cross section of the piston 141 may be formed larger than a diameter of a cross section of the cylinder part 112. Therefore, the piston 141 is located outside the cylinder part 112.

The head of the moving nut 142 may include a curved surface, and the piston 141 may include a curved surface corresponding to one surface close to the head of the moving nut 142. For example, if the head of the moving nut 142 includes a convex curved surface, the corresponding surface of the piston 141 may include a concave curved surface. The curved surface of the moving nut 142 and the curved surface of the piston 141 may contact each other in correspondence with each other.

The seal part 144 is configured to block a gap generated between the piston 141 and the head of the moving nut 142. The seal part 144 blocks foreign substances from entering the inside of the piston 141.

The moving nut 142 includes a first groove 142a formed along a circumference of the head, and the piston 141 includes a second groove 141a on an inner surface corresponding to the first groove. When the piston 141 and the moving nut 142 are connected, the first groove 142a and the second groove 141a face each other, and a space in which the seal part 144 is to be located is provided by the first groove 142a and the second groove 141a. Accordingly, the seal part 144 may be located in a space formed by the first groove 142a of the moving nut 142 and the second groove 141a of the piston 141. The seal part 144 may have a shape formed along the space formed by the first groove 142a and the second groove 141a and may have a ring shape. The shape of the seal part 144 may be applied differently depending on the shape of the cross section of the moving nut 142. In addition, the cross section of the seal part 144 may be formed in a rectangular or circular shape, and the groove shapes of the first groove 142a and the second groove 141a may be changed to correspond to the shape of the cross section of the seal part 144. The seal part 144 may include components and materials commonly used for sealing.

The seal part 144 blocks the gap between the moving nut 142 and the piston 141, and connects the moving nut 142 and the piston 141 to prevent the moving nut 142 and the piston 141 from separating from each other. At this time, the moving nut 142 and the piston 141 may be connected with a predetermined gap between the surface of the head of the moving nut 142 and the inner surface of the piston 141. In the state in which there is no external force, a predetermined gap is formed between the curved surface of the head of the moving nut 142 and the corresponding curved surface of the piston 141. At this time, the predetermined gap may be 2 mm or less.

The piston 141 may be capable of flexible movement within the range permitted by the above-described predetermined gap. Therefore, the axial direction of the piston 141 may be slightly inclined differently from the axial direction of the moving nut 142.

When the pads of the brake pad 130 are asymmetrically worn, if the brake pad 130 presses the brake disc, external force is applied to tilt the brake pad 130 due to the inclination of the worn pad surface. However, in the brake device 100 according to the embodiment, since the brake pad 130 may be slightly inclined, the amount of external force received by the piston 141 or the moving nut 142 is significantly reduced, and the possibility of damage is low.

In addition, the gap between the moving nut 142 and the piston 141 may improve the return performance of the brake pad 130 and prevent a collision between the moving nut 142 and the piston 141 due to vehicle vibration. Since collision between the piston 141 and the moving nut 142 is prevented, noise of the device may be reduced and the durability thereof may be improved.

The moving nut 142 may move forward by the above-mentioned distance or more and then transfer pressure to the piston 141 to move the piston 140 forward only when coming into contact with the piston 141. In case of backward movement, the piston 141 may be moved backward only when the moving nut 142 moves backward by the corresponding distance or more. In case of forward or backward movement, a section in which only the moving nut 142 moves without moving the piston 141 may be referred to as an invalid stroke section, and the invalid stroke section may be set to 2 mm or less. That is, the aforementioned arbitrary distance may be set to 2 mm or less.

Figure 7A:
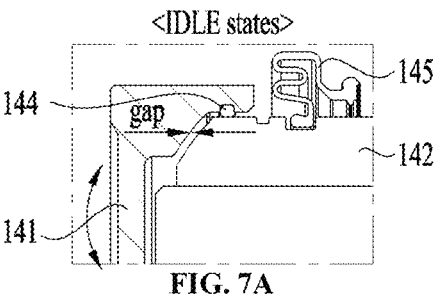
FIGS. 7A, 7B and 7C show a connection between a piston and a moving nut of a brake device according to an embodiment of the present disclosure.
Figure 7B:
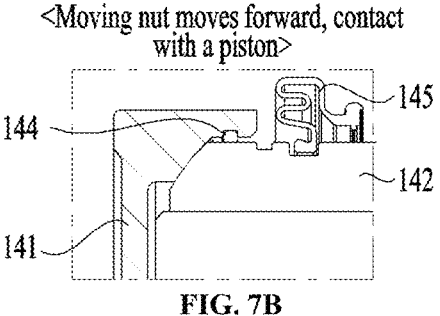
Figure 7C:
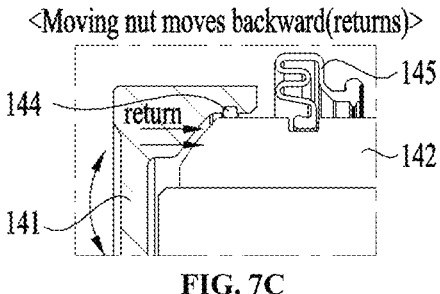

FIG. 7 shows a connection between the piston 141 and the moving nut 142 of the brake device 100. FIG. 7A shows a gap between the moving nut 142 and the piston 141 in an idle state. FIG. 7B shows a state in which the moving nut 142 and the piston 141 are in contact when the moving nut 142 moves forward. At this time, the curved surface of the moving nut 142 and the inner curved surface of the piston 141 are in surface contact. FIG. 7C shows a case in which the moving nut 142 moves backward (returns). When the brake device 100 returns, the moving nut 142 directly pulls the piston 141, and thus the return performance may be definitely improved.

The boot 145 blocks a gap between an outer edge of the cylinder part 112 and an outer surface of the moving nut 142 to block inflow of foreign substances from the outside.

The cylinder part 112 includes a third groove 114 formed along an inner edge, and the moving nut 142 includes a fourth groove formed along an outer circumferential surface. The fourth groove is located outside the cylinder part 112. One end of the boot 145 is inserted into and fixed to the third groove 114, and the other end of the boot 145 is inserted into and fixed to the fourth groove. The boot 145 is formed with a plurality of folded folds, and thus even if the position of the moving nut 142 changes, the boot 145 may be flexibly deformed, and the space between the moving nut 142 and the cylinder part 112 may be blocked from the outside.

In the brake device 100, one conversion assembly may be provided regardless of the number of pistons. When a plurality of pistons are provided, the plurality of pistons may be moved integrally by one conversion assembly. Since a separate conversion assembly is not required for each piston, cost and weight may be reduced, and the surface pressure of the brake pad 130 may be improved.

Figure 8:
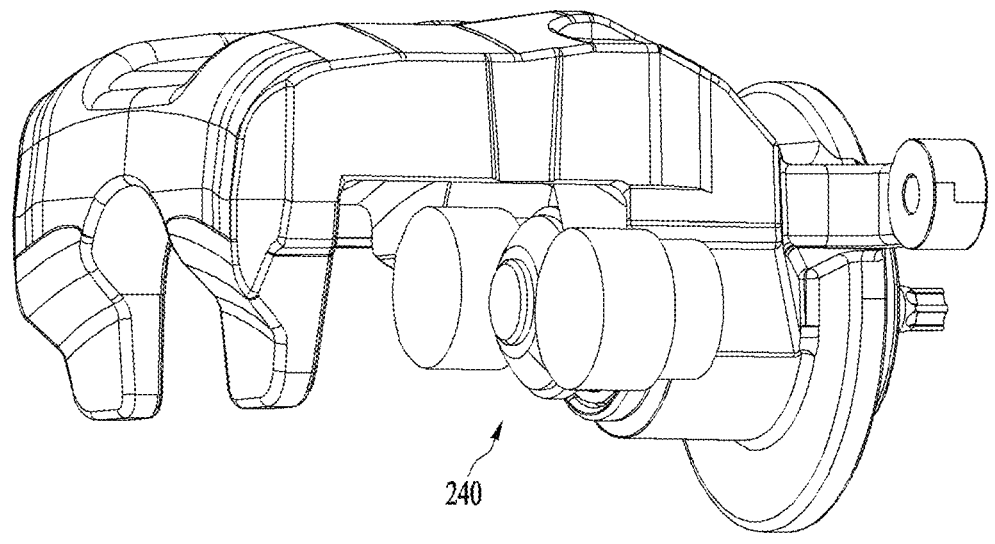
FIG. 8 is a perspective view of a caliper body and a pad propulsion part according to another embodiment of the present disclosure.
Figure 9:
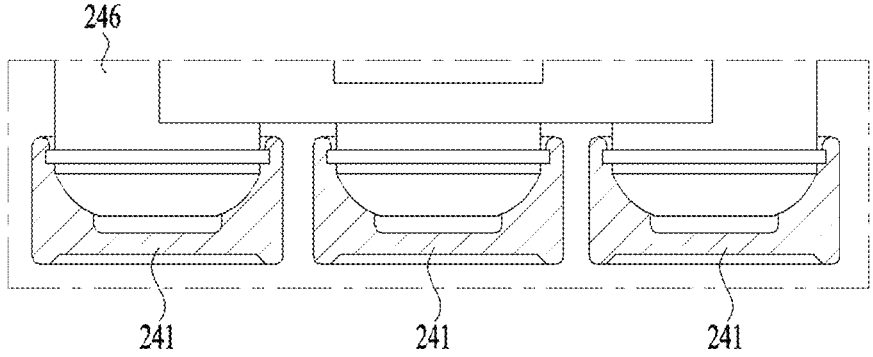
FIG. 9 shows a piston and a connection part in a pad propulsion part of FIG. 8.

For example, FIG. 8 shows a caliper body and a pad propulsion unit 240 of the brake device 100 according to another embodiment. FIG. 9 shows the piston 241 and a connection part 246 in the pad propulsion part of FIG. 8.

Referring to FIGS. 8 and 9, two pistons may be connected to one conversion assembly. At this time, a portion of the moving nut may be connected to the bolt screw while being located in the cylinder part, and another portion may be inserted into and connected to the inside of the plurality of pistons 241. Portions of the moving nut inserted into the plurality of pistons 241 and connected to the pistons 241 may be referred to as the connection part 246. The moving nut includes a plurality of the connection parts 246 to be respectively connected to a plurality of pistons 241.

The plurality of pistons 241 are located outside the cylinder part, and similarly, the connection parts 246 may be located outside the cylinder part.

Each of the connection part 246 may include a first groove formed along the circumference, and each of the pistons 241 connected to each of the connection part 246 may include a second groove at a position corresponding to the first groove on an inner surface. Also, the seal unit may be located in a space formed by the first groove and the second groove. That is, each of the plurality of pistons may be connected to the plurality of the connection parts 246 by the seal part. In addition, a predetermined gap may be provided between the surfaces of the connection parts 246 and the inner surfaces of the pistons 241, and in this case, the gap may be 2 mm or less.

In the brake device 100, the conversion assembly may further include various structures to be devised by a person skilled in the art in addition to the ball screw structure. For example, a combination of a rack gear and a pinion gear may convert gear rotation into linear motion.

Figure 10:
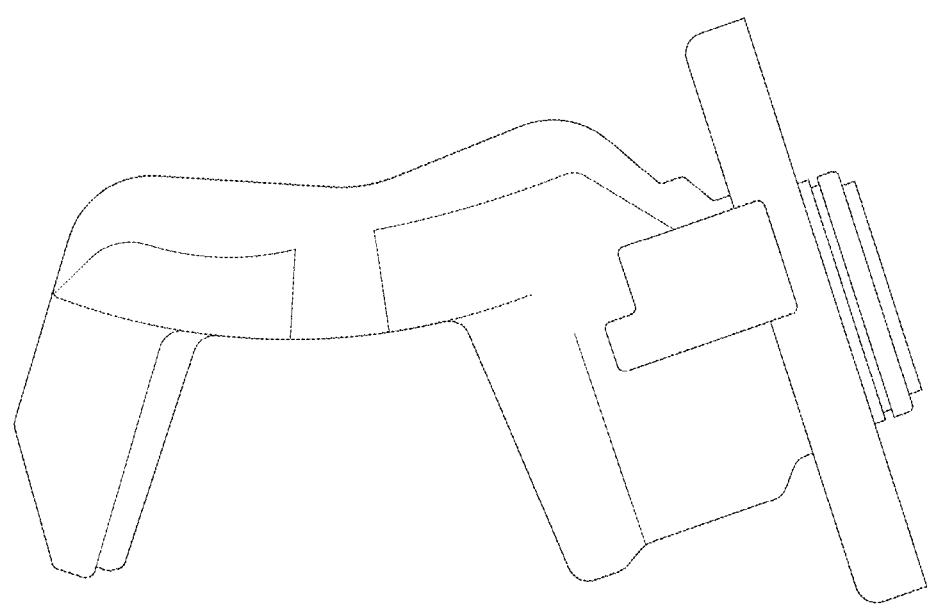
FIG. 10 shows a shape of a modified caliper body.

FIG. 10 shows an example of a modified caliper body 110. The caliper body 110 may be deformed as shown in FIG. 10 by external force generated according to a brake operation. When this deformation occurs, the pad surface of the brake pad does not stably contact the surface of the brake disc, causing partial wear of the pad. Also, a direction in which the brake pad moves is not perpendicular to the surface of the brake disc. Therefore, external force may act on the pad propulsion unit by an operation of pressing the brake disc, and may cause damage to the piston, the moving nut, or the bolt screw.

However, since the axial direction of the piston 141 is more flexibly adjusted in the brake device 100 according to the embodiments, the brake disc may be pressed while the slope of the pad surface is deformed. Therefore, the magnitude of the external force is reduced and the risk of damage to the part is low.

In the brake device 100, the piston 141 connected to the brake pad 130 does not directly contact the caliper body 110. That is, since the cylinder part 112 for accommodating the piston is not required for the caliper body 110, the size or volume of the cylinder part 112 may be reduced, and the weight and manufacturing cost may be reduced.

The brake device 100 may improve the surface pressure of the brake pad 130 by applying a plurality of pistons to one of the brake pad 130. Regardless of the caliper body 110, a plurality of pistons may be applied by taking the advantage of reducing the size of the piston, and the plurality of pistons may equally improve the surface pressure of the brake pad 130.

It is understood that the description of the various embodiments of the present disclosure is not limited to that embodiment, and the technical idea of each embodiment applied in the various embodiments may also be applied to other embodiments.

Detailed descriptions of the exemplary embodiments of the present disclosure disclosed as described above are provided to enable those skilled in the art to implement and practice the present disclosure. Although the above has been described with reference to preferred embodiments of the present disclosure, those skilled in the art may understand that the present disclosure is to be variously modified and changed without departing from the scope of the present disclosure. For example, those skilled in the art may use each configuration described in the above-described embodiments in a manner of combining with each other.

The present disclosure is not to be limited to the embodiments shown herein, but is to be accorded the widest scope consistent with the principles and novel features disclosed herein.

What is claimed is:

1. A brake device comprising:
a brake pad;
a pad propulsion part connected to the brake pad and configured to move the brake pad linearly; and
a caliper body including a cylinder part on which the pad propulsion part is accommodated, wherein the pad propulsion part includes:
a conversion assembly converting rotation motion into linear motion; and
a piston connected to one end of the conversion assembly,
the conversion assembly is accommodated inside the cylinder part, the piston is entirely located outside the cylinder part,
one end of a moving nut is inserted into an inside of the piston and includes a first groove disposed along a circumference of the moving nut,
the piston includes a second groove at a position corresponding to the first groove on an inner surface of the piston, and
the brake device further includes a seal part having a ring shape located in a space provided by the first groove and the second groove.

2. The brake device of claim 1, wherein the conversion assembly includes:
a bolt screw rotating around an axis; and
the moving nut coupled to a helix of the bolt screw,
wherein the moving nut moves in a direction of the cylinder part by rotation of the bolt screw.

3. The brake device of claim 2, wherein a diameter of a cross section of the piston is greater than a diameter of a cross section of the cylinder part.

4. The brake device of claim 2, wherein a surface of the one end of the moving nut and the inner surface of the piston are spaced apart from each other by a predetermine distance.

5. The brake device of claim 4, wherein the predetermined distance is equal to or less than 2 mm.

6. The brake device of claim 2, wherein:
the cylinder part includes a third groove provided along an edge of a space;
the moving nut includes a fourth groove provided along a circumference of an outer circumferential surface of the moving nut;
the brake device further includes a boot sealing a space between an outer surface of the moving nut and an edge of the cylinder part from an outside; and
the boot is fixed by the third groove and the fourth groove.

7. The brake device of claim 6, wherein:
a cross section of the seal part is a rectangle; and
the first groove and the second groove have a shape corresponding to the cross section of the seal part.

8. The brake device of claim 6, wherein:
a cross section of the seal part is a circle; and
the first groove and the second groove have a shape corresponding to the cross section of the seal part.

9. The brake device of claim 2, wherein:
the piston is provided in plurality;
the moving nut has a portion located inside the cylinder part and includes connection parts inserted into and connected to the pistons; and
the connection parts are located outside the cylinder part.

10. The brake device of claim 9, wherein:
the connection parts include first grooves disposed along a circumference of the connection parts;
the pistons include second grooves at positions corresponding to the first grooves on respective inner surfaces of the pistons; and
the brake device further includes a plurality of seal parts located in a space provided by the first grooves and the second grooves.

11. The brake device of claim 10, wherein surfaces of the connection parts and inner surfaces of the pistons are spaced apart from each other by a predetermined distance.

12. The brake device of claim 11, wherein the predetermined distance is equal to or less than 2 mm.

\* \* \* \* \*